United States Patent [19]
Seely

[11] 3,911,304
[45] Oct. 7, 1975

[54] BRUSH ASSEMBLY FOR A PORTABLE ELECTRIC TOOL

[75] Inventor: Robert W. Seely, Easley, S.C.

[73] Assignee: The Singer Company, New York, N.Y.

[22] Filed: June 10, 1974

[21] Appl. No.: 477,878

[52] U.S. Cl. ............... 310/242; 310/50; 310/89; 30/216
[51] Int. Cl.² ................................ H02K 13/00
[58] Field of Search .......................... 310/239–247, 310/89, 47, 50; 322/1; 318/17; 173/117, 163, 170; 30/216, 220, 228

[56] References Cited
UNITED STATES PATENTS

| | | | |
|---|---|---|---|
| 3,336,490 | 8/1967 | Yelpo | 310/50 |
| 3,413,498 | 11/1968 | Bowen | 310/47 |
| 3,431,445 | 3/1969 | Petersen | 310/239 |
| 3,432,703 | 3/1969 | Sheps | 310/50 |
| 3,457,438 | 7/1969 | Badcock | 310/50 |
| 3,462,623 | 8/1969 | Batson | 310/50 |
| 3,463,950 | 8/1969 | Schadlich | 310/50 |
| 3,536,943 | 10/1970 | Bowen | 310/50 |
| 3,652,879 | 3/1972 | Plunkett | 310/47 |

*Primary Examiner*—R. Skudy
*Attorney, Agent, or Firm*—Marshall J. Breen; Edward L. Bell; Harold Weinstein

[57] ABSTRACT

A portable electric tool wherein the motor housing is of clam shell construction with each shell or segment having a confronting interface portion. A pair of oppositely disposed conductive sleeves supported by the shells are accessible through a pair of threaded holes formed in the motor housing at the interface portions. A brush member is slidably disposed in each sleeve and detachable threaded caps inserted in each threaded hole confine the brushes in the housing. When the threaded caps are not in place in the housing the brush members can be either installed in or removed from the tool without disassembling the motor housing shells.

2 Claims, 3 Drawing Figures

U.S. Patent   Oct. 7,1975   3,911,304
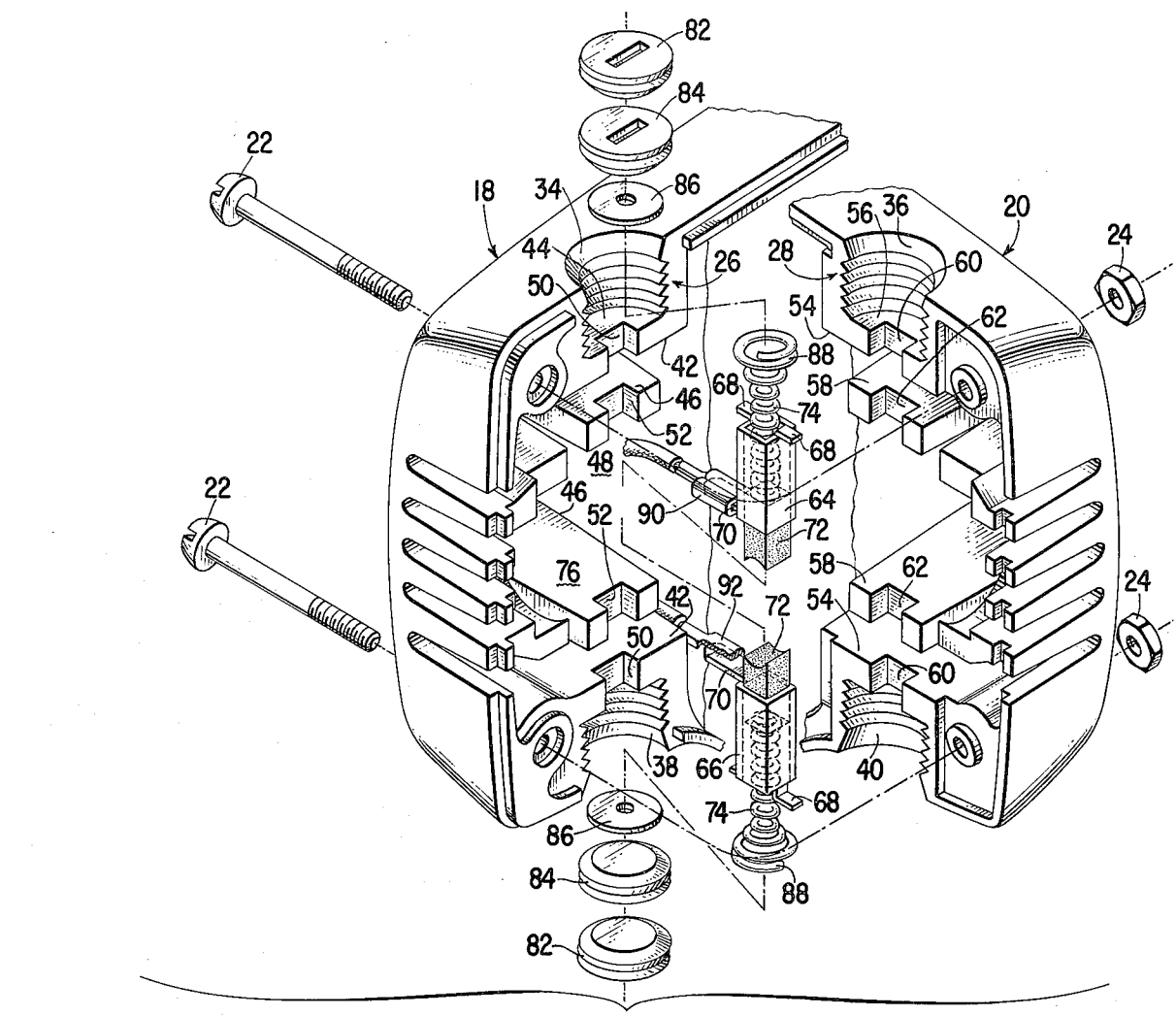
Fig.2
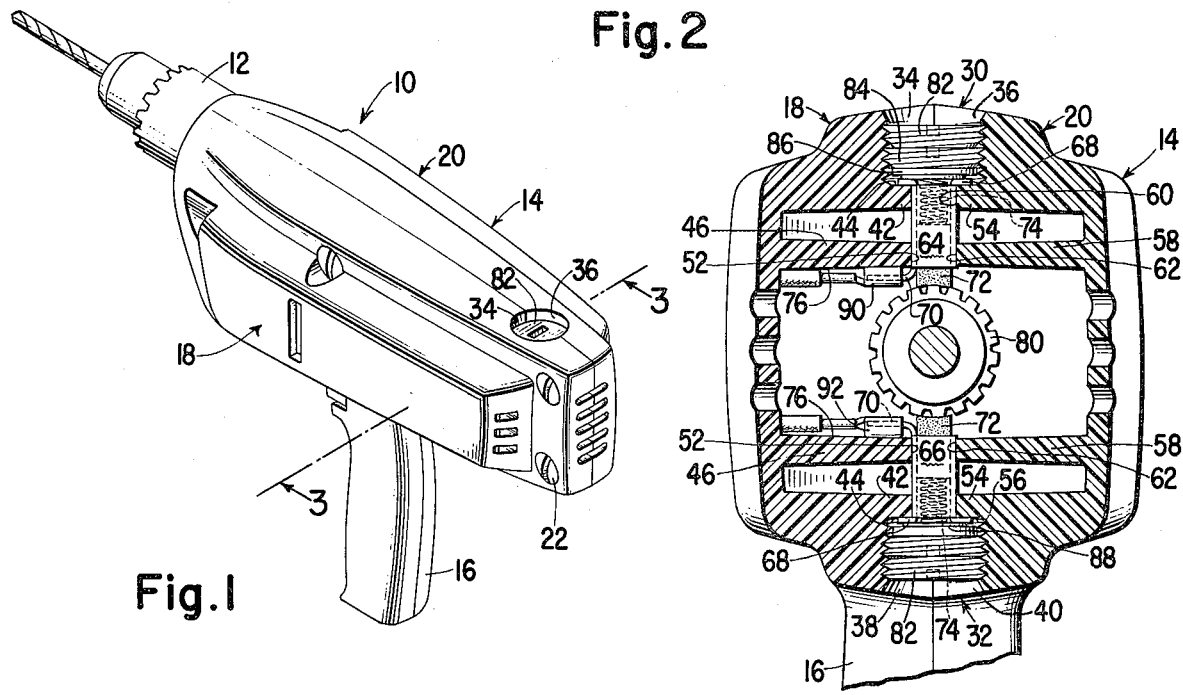
Fig.1
Fig.3

BRUSH ASSEMBLY FOR A PORTABLE ELECTRIC TOOL

BACKGROUND OF THE INVENTION

This invention relates to portable electric tools and more particularly to a novel brush assembly support arrangement in a portable tool motor housing of clam shell construction.

In assembling, or disassembling a portable electric tool it is often desirable that the motor housing be of clam shell construction to facilitate positioning or repair of the interior parts. It is also advantageous to have brushes that can be installed in or removed from the tool without taking the motor housing apart. This feature is especially desirable when a minor adjustment, cleaning or replacement of the brushes is required. Although there are known electric tools which permit the interior brushes, to be installed in or removed from an assembled housing the known constructions generally require each brush and a brush retainer tube to be mounted in a separate insulated holding member that is attached to the motor housing by clips, adhesives, pins or other special securing devices.

It is thus desirable to provide a portable electric tool having a motor housing of clam shell construction wherein the brushes can be installed in or removed from the tool without taking the housing apart and which tool does not require a separate insulated brush holding member.

Among the several objects of the present invention may be noted the provision of a novel portable electric tool having a novel brush assembly support arrangement; a novel portable electric tool which eliminates a separate insulated holding member for the brushes and permits the brushes to be installed in or removed from the tool without taking the motor housing apart; a novel portable electric tool having a motor housing of clam shell construction with externally accessible brushes supported at the interface of the clam shell housing; and a novel portable electric tool having a motor housing of clam shell construction wherein a detachable threaded cap is provided at the interface of the clam shells to confine the brushes to the housing interior and provide access to the brushes when desired. Other objects and features will be in part apparent and in part pointed out hereinafter.

SUMMARY OF THE INVENTION

The present invention relates to a novel portable electric tool wherein the motor housing is of clam shell construction and the brushes can be installed in or removed from the tool without taking the motor housing apart. The motor housing comprises first and second housing segments having confronting interface portions with a pair of oppositely disposed brush retainer tubes sandwiched therebetween in recesses formed at the interface portions. A spring biased brush member is slidably disposed in each brush retainer tube and is accessible through a threaded access hole formed at the confronting interface portions. Substantially symmetrical portions of each threaded access hole are formed in each housing segment and extend from the exterior surface of the motor housing to the interior brush retainer tubes. The access hole threads in one segment are continuous with the substantially symmetrical access hole threads in the confronting housing segment and accommodate one or more insulated threaded caps and an insulating disc, to bear against the brush spring and bias the brush in a predetermined direction. When the caps and disc are not in place a brush can be installed in or removed from the brush retainer tube without separating the motor housing segments.

The invention accordingly comprises the constructions hereinafter described, the scope of the invention being indicated in the following claims.

DESCRIPTION OF THE DRAWINGS

In the accompanying drawing:

FIG. 1 is a perspective view of a portable electric tool incorporating a preferred embodiment of the present invention;

FIG. 2 is an enlarged fragmentary exploded view of the motor housing; and,

FIG. 3 is a sectional view taken on the line 3—3 of FIG. 1.

Corresponding reference characters indicate corresponding parts throughout the several views of the drawings.

DESCRIPTION OF THE INVENTION

Referring to the drawing for a detailed description of the present invention FIG. 1 illustrates a portable electric tool which is generally indicated by reference number 10. The tool 10 comprises a chuck 12 and a motor housing 14 having a depending handle portion 16.

The motor housing 14 is formed of any suitable plastic insulating material and includes first and second substantially symmetrical housing segments 18 and 20 held together in clam shell fashion by screws 22 and nuts 24 for example. Each of the housing segments 18 and 20 has an interface portion generally indicated by 26 and 28 respectively. The interface portions 26 and 28 confront each other when the housing segments 18 and 20 are fastened together.

The motor housing 14 further includes oppositely disposed threaded access holes 30 and 32 formed in the housing segments 18 and 20 (FIG. 3). Each of the threaded access holes 30 and 32 comprise generally symmetrical threaded access portions 34, 36 and 38, 40 respectively formed in the segments 18 and 20 at the interface portions 26 and 28. The threads in each of the access portions 34, 38 of the segment 18 are continuous with the threads in the corresponding access portions 36, 40 of the segment 20.

At each of the access portions 34 and 38 on the segment 18 a minor flange 42 defines a bottoming surface 44. Each minor flange 42 is spaced from a major flange 46 projecting from a side wall 48 of the segment 18. A pair of aligned recesses 50 and 52 are formed in the flanges 42 and 46 in alignment with the axes of the threaded access holes 30 and 32. The threaded access portions 36 and 40 in the segment 20 include corresponding symmetrical minor flanges 54, 54 bottoming surfaces 56, 56 major flanges 58, 58 and aligned recesses 60, 62 and 60, 62.

A pair of identical oppositely disposed electrically conductive brush retainer tubes 64 and 66 which are generally rectangular in cross-section are sandwiched between the segments 18 and 20 in the complementary shaped recesses 50, 52 and 60, 62 respectively. Each of the brush retainer tubes 64 and 66 include bent tab portions 68, 68 at one end thereof and a bent terminal portion 70 at the opposite end thereof. A brush member 72 is slidably disposed in each of the brush retainer tubes 64 and 66 and includes a spiral shaped coil spring 74 secured to one end thereof.

Prior to securing the housing segments 18 and 20 together the brush retainer tubes 64 and 66 are mounted in the recesses 50, 52 and 60, 62, such that the bent tabs 68, 68 engage the bottoming surfaces 44 and 56 of the confronting threaded access portions 34, 38 and 36, 40, with the bent terminals 70, 70 being disposed beyond the surfaces 76, 76 of flanges 46, 46. The bent tabs 68, 68, limit movement of the retainer tubes 64 and 66 toward a commutator 80. The brush members 72, 72 can then be deposited in the retainer tubes 64 and 66. After the segments 18 and 20 are aligned and fastened together by screws 22 and nuts 24 a pair of threaded caps 82 and 84 formed of a suitable insulating material and an insulated disc 86 are inserted in each of the threaded holes 30, 32 the disc 86 bearing against the spring 74 to urge each of the brush members 72, 72 toward the commutator 80. An enlarged coil 88 at the end of each spring 74, 74 bears against the bent tabs 68, 68 under the influence of caps 82, 84 and disc 86 to prevent movement of the retainer tubes 64 and 66 along the axes of the threaded holes 30 and 32. A pair of wire connectors 90 and 92 arranged to communicate with a power source (not shown) accommodate bent terminals 70, 70.

The threaded caps 82 and 84, when screwed into the access holes 30 and 32 confine the brush members 72, 72 to the brush retainer tubes 64 and 66 in the interior of the motor housing 14. The threaded holes 30 and 32 each have a diameter that encircles the recesses 50, and 60 in the flanges 42, and 54. Consequently removal of the caps 82, 84 and the disc 86 from the holes 30 and 32 permits the brush members 72, 72 to be entirely withdrawn from the retainer tubes 64 and 66 in the motor housing 14 without disassembling the housing segments 18 and 20. Installation of the brushes 72, 72 back into the retainer tubes 64 and 66 is also accomplished without disassembling the housing segments 18 and 20.

Some advantages of the novel portable electric tool evident from the foregoing description include a brush member that can be installed in or removed from an assembled motor housing without the brushes being supported in a separate insulated retainer tube holder.

In view of the above it will be seen that the several objects of the invention are achieved and other advantageous results obtained.

As various changes can be made in the above constructions without departing from the scope of the invention it is intended that all matter contained in the above description or shown in the accompanying drawing shall be interpreted as illustrative and not in a limiting sense.

Having thus set forth the nature of the invention, what is claimed herein is:

1. A brush assembly for a power tool comprising:
    a. a clam shell housing having a first housing portion and a second housing portion interconnected to each other to define a mating line therebetween,
    b. the clam shell housing formed of dielectric material,
    c. a universal motor mounted in the clam shell housing having an armature shaft journaled therein,
    d. a commutator affixed to the armature shaft and operatively connected to the motor,
    e. a radial brush aperture in superposition to the commutator and being formed at the mating line to extend into both the first and the second housing portions,
    f. the brush aperture has a lower section with a slot extending between a pair of spaced shoulders formed in the lower section,
    g. the brush aperture has an upper section disposed radially above the lower section, and the upper section formed with threads therein and being externally accessible,
    h. one of the shoulders formed at the juncture of the upper and lower sections of the brush aperture,
    i. the other shoulder formed on the underside of the lower section of the brush aperture,
    j. a metallic tube affixed in the slot of the brush aperture,
    k. a pair of spaced transverse tabs formed on the metallic tube, one tab to engage the upper shoulder and one tab to engage the lower shoulder to prevent radial movement of the tube in the brush aperture,
    l. means on the tube at the underside of the slot to electrically connect the brush assembly in circuit with the motor,
    m. a brush insertable into the brush aperture to be radially slidable in the tube and adapted to operatively engage the commutator,
    n. a coil spring carried on the brush, and
    o. a cap threadedly connected to the upper section of the aperture to compress the spring and urge the brush to engage the commutator.

2. The combination claimed in claim 1 wherein:
    a. the lower tab defining means for electrically connecting the brush assembly in circuit with the motor.

* * * * *